Patented June 7, 1949

UNITED STATES PATENT OFFICE 2,472,495

CONDENSATION PRODUCT OF A POLYHALOGENATED ALIPHATIC HYDROCARBON AND A COPOLYMER OF A POLYMERIZABLE CYCLIC COMPOUND AND AN UNSATURATED ALIPHATIC HYDROCARBON

William J. Sparks, Cranford, and David W. Young, Roselle, N. J., assignors to Standard Oil Development Company, a corporation of Delaware No Drawing. Application May 3, 1945, Serial No. 591,843

14 Claims. (Cl. 260—88.1)

This invention relates to novel chemical products and to methods of preparing and using same, and more particularly it relates to making and using novel derivatives of high molecular weight copolymers of which a styrene-isobutylene copolymer is one example.

Copolymers of styrene and isobutylene, and more generally copolymers of aliphatic olefins with polymerizable cyclic compounds, are disclosed in U. S. Patent 2,274,749. The general method of preparing such copolymers is also disclosed therein and consists essentially in carrying out the copolymerization of the mixed reactants at a temperature below 0° C. such as −10° C., −50° C., −80° C., −100° C., or even lower, in the presence of an active halide polymerization catalyst, and preferably in the presence of an inert, volatile organic liquid serving as solvent and refrigerant.

Instead of styrene, other polymerizable cyclic material may be used such as alphamethyl styrene, paramethyl styrene, alphamethyl paramethyl styrene, indene, terpene, coumarone, etc., as well as copolymers of indene and coumarone and para methoxy styrene type copolymers.

Instead of isobutylene, other isoolefins may be used such as isoamylene, particularly methyl-2 butene-2, isooctylene etc., as well as other aliphatic olefins such as propylene, normal butylene, and even ethylene if the copolymerization is carried out under super-atmospheric pressure.

The proportions in which the styrene or other polymerizable cyclic material and the isobutylene or other aliphatic olefin material may be copolymerized, may vary over a wide range from 1 to 50 or 90 or even 99% of the polymerizable cyclic constituent. In fact, an even smaller amount of such cyclic material may be used such as even 0.05% or less, it being sufficient to merely have 1 or 2 molecules of the styrene or other polymerizable cyclic material combined into a relatively long chain of isobutylene or other aliphatic olefin, the aromatic nucleus of the styrene serving as a chemical handle by which the high molecular weight resultant copolymer may be subjected to the subsequent novel chemical condensation according to the present invention.

For convenience and brevity, the above described copolymer of a cyclic polymerizable material and an olefin will be referred to as a cycalkene copolymer. The specific type of copolymer made from styrene and isobutylene will similarly be referred to for brevity as stybutene. The invention will be illustrated as applied particularly to stybutene, although it is not to be limited thereto.

The copolymer to be used may also be a tripolymer of a polymerizable cyclic compound, and olefinic compound and a small amount between 0.1–40% or so, preferably 0.5 to 20% of a polyene (conjugated), e. g. isoprene, butadiene, cyclopentadiene, myrcene, ocimene, etc. One example of such a tripolymer is one comprising about 50% of isobutylene, 47% of styrene and 3% of isoprene, in the combined state. A second example of such a tripolymer is one comprising about 30% of alpha methyl styrene, 40% isobutylene, and 30% butadiene. This polymer is made at about −25° C., by use of AlCl₃-methyl chloride catalyst. A third example of such a type tripolymer is one comprising about 10% para bromo styrene, 80% isobutylene and 10% butadiene. This polymer is made at −103° C. by the use of the AlCl₃-methyl chloride catalyst.

Broadly, the present invention comprises reacting any of the above types of copolymers, a dihalogenated or other polyhalogenated oganic compound, such as a dihalogenated hydrocarbon compound having the general formula $RX_2$ where R represents a hydrocarbon group and X represents halogen, attached to R through aliphatic carbon linkages. Examples of such reagents include ethylene dichloride, propylene dichloride and higher alkylene dichloride, as well as corresponding bromide derivatives, or mixtures of two or more different alkylene halide compounds or other polyhalogenated hydrocarbons such as tri chloro tri fluoro propylene, dimer and trimer of tri chloro tri fluoro propylene, di fluoro ethane, $CCl_4$, tri fluoroalkyl alkyl ethers, carbon tetrafluoride (Freon 14), 1-chloro-1, 1-di fluoro ethane (Freon 142), chloro pentafluoro ethane (Freon 115). Higher molecular weight reagents may be prepared for instance by halogenating paraffin wax or other paraffinic hydrocarbons such as cetane, octadecane, tri isobutylene, polymethyl pentadiene, polypropylene, polybutene, polyethylene butyl rubber, etc. It will be understood of course that when such hydrocarbons are halogenated, for example chlorinated, the resulting product will generally consist of a mixture of monochlor, dichlor and/or trichlor derivatives, depending essentially upon the total amount of chlorine combined into the hydrocarbon product. For the purposes of the present invention, the amount of incorporated halogen (or mixed halogen) should usually range from about 10–30%, preferably from about 10 to 15 or 20%. Very good results have been obtained with chlorinated paraffin wax containing from 12 to 14% of chlorine; such a product containing for instance 12% of chlorine probably contains monochlorinated wax molecules and dichlorinated wax molecules in approximately the same proportion, whereas if the total product contains about 14% of chlorine, the proportion of dichlorinated molecules probably slightly exceeds the proportion of monochlor molecules. Good results have been obtained with a wax that contained 2% fluorine and 14% chlorine. Also interesting results have been obtained on a wax that contained a trace of Br, 1% of F, and 14% chlorine.

The condensation of the halogenated hydrocarbons with the copolymer should preferably be carried out in the presence of a Friedel-Crafts condensation catalyst such as aluminum chloride, boron fluoride, $AlBr_3$, $AlBr_2Cl$, $AlCl_2Br$, $Al_2Br_5Cl$, $[Al_2Br_5Cl.AlOBr]$, $[AlCl_2OH.AlCl]$ etc., preferably also in the presence of a solvent, which may either be inert under the conditions of the reaction, such as tetrachlorethane, carbon tetrachloride, etc., or it may be an aromatic type of solvent, such as benzene, toluene, or a petroleum aromatic naphtha, which is capable of condensing with one of the two halogen atoms on the dihalo hydrocarbons used as reagents. A refined heavy petroleum naphtha may be used, which consists chiefly of saturated hydrocarbons and a small amount of aromatics. The use of these latter reactive solvents tends to produce a final condensation product soluble in mineral oil, even when a low molecular weight pure dihalo hydrocarbon, such as ethylene dichloride, is used, whereas if ethylene dichloride is used as reagent, with little or no aromatic solvent present then the resulting product is an oil-insoluble condensation product useful as a synthetic rubber, or resin, depending upon the relative proportions of cyclic constituents in the original copolymer. For instance with a high proportion of styrene or other cyclic constituents, resulting products will be more resinous in nature, whereas with a lower proportion of styrene and higher proportion of aliphatic olefin compounds in the copolymer, the final product will be more rubbery in nature.

The condensation products of this invention may be compounded with other types of petroleum products such as paraffin wax, synthetic olefin polymer oils, petroleum mahogany sulfonate soaps, halogenated wax, white oils, and (extreme pressure) type compounded oils, as well as polybutene treated oils, asphalt, lubricating greases, or they may be used in other liquid products lighter than lubricating oils, already mentioned, such as Diesel fuels, synthetic polymer Diesel fuels, kerosene, naphthas, light white oils (used for hydraulic fluids), etc. They may also be compounded by hot milling, kneading, solvent solution etc. with numerous other types of resins or plastics e. g., high styrene-isoprene type resins, cyclopolybutadiene, cyclized deproteinized natural rubber, chlorinated cyclized natural rubber, polyesters, shellac, terpene resins, terpene copolymer resins, coumarone-indene resins, phenol formaldehyde, cyclopentadiene adduct of maleic acid or maleic anhydride and polyhydric alcohol and fat acid, polymethyl methacrylate, polyvinyl chloride and/or acetate, cellulose acetate, a polyamide resin made by condensation of dilinoleic acid or methyl dilinoleate with the polyamine, polystyrene, amine-aldehyde resins, coumarone and maleic alkyl, rosin, polysilicones, polyethylene, etc., natural rubber or synthetic rubbers, e. g., unsaturated polyesters, GR-S (butadienestyrene synthetic rubber), GR-I (butyl rubber made by low temperature Friedel-Crafts copolymerization of isobutylene with 1 to 3% of isoprene), GR-N (butadiene-acrylonitrile synthetic rubber), polymethylpentadiene, polybutadiene, butadiene-2 methyl-pentadiene copolymers that are rubber and butadiene-diisobutylene copolymers that are resins, other synthetic polymers, e. g., polypropylene or polyisobutylene having an average Staudinger molecular weight of about 2000 to 500,000, or even resinous or plastic copolymers of the styrene-isobutylene type such as used as raw materials in making the present condensation products. Several tests have indicated that these new polymers are processing aids for resins and synthetic rubbers. The new polymers impart some tack to GR-S, and GR-N. The new polymers also improve the processing of high molecular weight butyl (GR-I). These products may also be used for thickening and otherwise improving other liquid products such as fatty oils, e. g., linseed oil, fish oil, soybean oil etc., as well as paints, varnishes, lacquers, and other coating compositions. In making these various blended or compounded compositions, various powdered solid fillers may be used such as carbon black, sulfur, clay, $TiO_2$, Al powder, Cu powder, ZnO, Zn stearate, Zn super dimerate (Zn salt of dimer acids in polymer form), Al stearate, chlorinated polybutene, chlorinated "styrene-isoprene" copolymer, cyclic high molecular weight hydrocarbons, ground leather, $BaSO_4$, $CaCO_3$, glass wool, polystyrene, polyhalogenated styrenes, nitrated polystyrenes, copolymers of styrene and substituted styrenes, "styrene-isobutylene diolefin" resins, halogenated rubber, halogenated butyl rubber, lithium stearate, iron or lead oxide, molybdenum, orange pigment, tin oxide, titanium phosphate, halogenated polymethylpentadiene.

The objects, advantages and details of the invention will be better understood from a consideration of the following experimental data.

EXAMPLE 1

250 ml. of pure styrene was added to 750 ml. of liquid isobutylene of 99% purity, and the resulting olefin mixture was placed in a Dewar flask. To this solution was added 1 l. of methyl chloride and about 400 to 1000 grams of powdered solid dry ice ($CO_2$) to cool the mass to a reaction temperature of about $-78°$ C. The mixture was agitated as catalyst was added. Catalyst for the polymerization was 250 ml. of $AlCl_3$-MeCl (methyl chloride) solution. Concentration of $AlCl_3$ in the MeCl was 0.9 g/100 ml. Polymer formed as the catalyst was added and after about 8 minutes 30 ml. of isobutyl alcohol was added to kill the catalyst and stop the polymerization. The mixture was then removed from the Dewar flask and placed in a 2 l. Pyrex beaker. After 15 minutes water was added, and the stybutene polymer was washed and dried. Approximate Staudinger molecular weight 19,400.

The copolymer which contained about 30% of combined styrene, was then dissolved in refined heavy petroleum naphtha. The concentration of the polymer in the naphtha was about 30 g. polymer per 100 ml. naphtha. This 30% solution of copolymer in naphtha was not clear at room temperature. The 30% copolymer solution (300 ml.) was placed in a glass flask. 160 ml. more of naphtha was also added. The mixture was treated with 10 g. of $AlCl_3$. Temperature was increased to 150–210° F. for 30 minutes. After this 50 ml. of ethylene dichloride (cis) was added very slowly. After about 30 hours the reaction was killed. Polymer, green, brown in color, was removed by precipitation from the naphtha by the use of isopropyl alcohol. The molecular weight of polymer was about 10,900. This polymer was blended in Barosa 43 mineral oil, a highly paraffinic solvent extracted mineral lubricating oil base stock having a viscosity of about 43 seconds Saybolt at 210° F.

TABLE 1

V. I. potency of reacted stybutene in Barosa 43 (paraffinic) oil

[Barosa 43 oil—43 S. S. U. at 210° F.—V. I. 112]

| Per Cent Polymer | Centistokes Vis. at 100° F. | Centistokes Vis. at 210° F. | Calculated S. S. U. at 210° F. | V. I. |
|---|---|---|---|---|
| 1 | 43.8 | 7.24 | 49.84 | 140 |
| 3 | 65.6 | 10.93 | 62.47 | 141 |
| 6 | 124.7 | 19.85 | 97.50 | 130.2 |

EXAMPLE 2

A copolymer containing about 30% of combined styrene and about 70% of combined isobutylene was prepared by batch copolymerization at −103° C., using as catalyst a solution of aluminum chloride in methyl chloride similar to that described in Example 1. Three volumes of methyl chloride solvent were used per volume of mixed reactants. The resulting copolymer of mixed reactants. The resulting copolymer which was solid but elastic in texture, and had an average molecular weight of about 15,000, was subjected to a condensation reaction using the following amounts of materials:

Stybutene copolymer--------------------g-- 30
AlCl₃ -------------------------------g-- 2
Refined heavy naphtha (same as in Example 1)------------------------cc-- 200
Ethylene dichloride-------------------g-- 20

This mixture was heated for 24 hours, the reaction temperature being about 125°–160° F. The reaction product was recovered as in Example 1, and was found to be a sticky elastic brown type of polymer. It was oil-soluble and showed the followed viscosity and V. I. characteristics.

| Per Cent Polymer | Centistokes at 210° F. | V. I. |
|---|---|---|
| 0 (Base oil) | 5.45 | 112 |
| 1 | 7.23 | 129 |

EXAMPLE 3

The procedure of Example 2 was repeated except that 50 ml. of ethylene dichloride were used, and the amount of catalyst was 10 g. AlCl₃ per 300 ml. of 30% solution of the stybutene in naphtha. The reaction time was 16 hours and temperature about 150°–200° F. The resulting reacted copolymer had a molecular weight of about 7200 and showed the following viscosity and V. I. characteristics.

| Per Cent Polymer | Centistokes at 210° F. | V. I. |
|---|---|---|
| 0 (Base oil) | 5.45 | 112 |
| 1 | 6.58 | 124 |

EXAMPLE 4

Another test was made similar to Examples 2 and 3 in using a stybutene copolymer as one reactant that contained 10% styrene in copolymer, but a chlorinated paraffin wax containing about 14% chlorine was the other reactant, the amount being 50 grams, and 150 cc. of tetrachloroethane being used as solvent instead of the naphtha. The amount of catalyst was the same as in Example 3 but the reaction was carried out for 2 hours at 125° F. The resulting reacted copolymer, which may be referred to for brevity as a wax-stybutene, had an average molecular weight of about 16,280, was soluble in mineral oils, and showed the following viscosity and V. I. characteristics:

| Per Cent Polymer | C. S. at 100° F. | C. S. Vis. at 210° F. | V. I. |
|---|---|---|---|
| 0 (Base oil) | | 5.5 | 112 |
| 1 | 46.1 | 7.75 | 135 |
| 3 | 83.4 | 14.35 | 144 |
| 6 | 225.3 | 32.02 | 136 |

EXAMPLE 5

To illustrate how the process of this invention may be modified in order to produce an oil-insoluble type of condensation product, probably having a more interlinked chemical structure, the following test is reported: 30 g. of a stybutene copolymer similar to that used in Example 2, and containing about 30% of combined styrene, was dissolved in 200 cc. of ethylene dichloride, and 20 g. of AlCl₃ were added, using a reaction temperature of about 83° C. or 182° F. for a reaction period of about 5 hours. The resulting brown condensation product which had a rubbery-gel, sponge-like, sticky texture, was found insoluble in mineral lubricating oil. This product is adapted for use as an adhesive (when compounded with 50 parts 100,000 molecular weight polybutene and 10 parts resin) for bonding polyvinyl alcohol films to Pyrex glass, and as a processing aid for butadiene-acrylonitrile synthetic rubber made with 26% acrylonitrile (GR—N) and rubber. For example: 10 parts of this oil-insoluble gel-type sticky polymer reduced the 1½ min. Mooney of Perbunan at 212° F. from 68 to 37. Also, a milling test indicated that carbon black, as well as polysilicone oil (type 200), could be added at a good rate to Perbunan on a mill at 125° F. when the cross-linked polymer was present in the mix. This polymer did not reduce the tensile of cured Perbunan 26 by more than 12% when it was used in concentration of about 10 parts per 100 parts rubber. Also, some tack was imparted to the Perbunan before the standard 285° F. curing step. The test indicated that the ozone resistance of Perbunan is improved when compounded with the gel polymer as well as mixtures of the gel polymer with polysilicone.

EXAMPLE 6

Alphamethyl styrene and isobutylene, with 5% butadiene present in isobutylene, were copolymerized in approximately equal proportions at a temperature of about −78° C., using BF₃ as catalyst. 50 g. of the resulting copolymer, which had a molecular weight of about 10,000, was dissolved in 200 ml. of refined heavy naphtha (same as used in Example 1) and 50 ml. of chlorinated kerosene containing about 30% chlorine, was added thereto, together with 5 g. of aluminum chloride as catalyst. The reaction mixture was stirred and maintained at a temperature of about 180° F. for about 6 hours. The resulting reaction product, which may be referred to for brevity, as a kerosene-stybutene, slightly unsaturated type, was found to be soluble in mineral lubricating oils, at a molecular weight of about 10,500, and had the following viscosity and V. I. characteristics:

*V. I. study in low V. I. S. A. E. 20 type oil*

[V. I. of base oil = 12]

| Per Cent By Wt. Polymer | C. S. Vis. at 100° F. | Centistokes Vis. at 210° F. | V. I. |
|---|---|---|---|
| 1 | 119.6 | 9.64 | 49.2 |
| 3 | 188.0 | 14.50 | 101.2 |

Chemical analysis of polymer gave 87.89% C and 10.56% H.

EXAMPLE 7

20 g. of a stybutene having a combined styrene content of about 50%, and made at a temperature of about −101° C., was dissolved in 200 g. of ethylene dichloride and 150 ml. of tetra chlorethane, and 5 g. of $AlCl_3$ were added, and the reaction mixture was maintained at a temperature of about 90°–125° F., for about 5 hours, with stirring. The resulting reaction product, which may for brevity be referred to as a stybutene-$C_2H_4Cl_2$ condensation product, was found to be a plastic type polymer that was brown in color. The polymer made under these conditions was not soluble in a high V. I. mineral oil at room temperature. However, it was slightly soluble in a low V. I. type oil.

EXAMPLE 8

20 g. of a stybutene containing a combined styrene content of about 10% which had been made by a copolymerization at a temperature of −23° C., the boiling point of methyl chloride, was dissolved in 200 cc. of refined heavy naphtha, and 12.5 g. of chlorinated paraffin wax containing about 14% of chlorine was mixed therewith, and 5 g. of $AlCl_3$ were added as catalyst, using a reaction temperature of about 100° F. for a duration of about 4 hours. The resulting isopropyl alcohol washed and air-dried wax-stybutene which had a 12,000 Staudinger molecular weight polybutene type texture, was soluble in mineral lubricating oils and had the following viscosity and V. I. characteristics:

*V. I. data in Barosa 43 mineral oil*

[Barosa 43 oil (43 S. S. U. at 210° F.—V. I. = 112)]

| Per Cent Polymer By Wt. in Oil | C. S. at 210° F. | V. I. |
|---|---|---|
| 1 | 7.3 | 131 |
| 3 | 10.2 | 135 |

This product was also found to have pour depressing properties, i. e., it was capable of depressing or lowering the pour point of waxy mineral lubricating oils when added thereto in small amounts, as shown by the following data:

| Per Cent Product in Oil | A. S. T. M. Pour Point, °F. |
|---|---|
| 0 | +25 |
| 1 | −15 |
| 2.5 | −20 |

EXAMPLE 9

25 g. of a stybutene containing about 60% of combined styrene and made at a temperature of −44° C., were dissolved in 300 cc. of carbon tetrachloride and solvent. 20 g. of $AlCl_3$ were added, and after adjusting the temperature to 90° F., 100 g. of chlorinated paraffin wax (made by direct chlorination of 118° F. melting point wax to 14.5% chlorine content), was added in four portions over a period of 15 minutes. Condensation of the stybutene with the chlorwax was vigorous as evidenced by the evolution of hydrogen chloride gas. The reaction was continued at 90° F. for an additional 3 hours, at the end of which time the reaction mixture had become very viscous. At this point an additional 300 cc. of $CCl_4$ was added to dilute the mixture, and the $AlCl_3$ was destroyed by adding an alcohol-water mixture. After settling and washing with water, 100 g. of a paraffinic mineral oil (43 sec. Saybolt Univ. at 100° F.) was added to the solvent extract of the reaction product, and the solvent was then removed by vacuum distillation at 50 mm. mercury pressure and at 250° F. The yield of 203 g. of approximately 50% solution of the wax-stybutene condensation product in mineral oil was obtained as product.

The pour depressing potency of this product was tested by blending it in various concentrations in a waxy (i. e., wax-containing) lubricating oil, and then determining the pour point of the resulting blend by the standard A. S. T. M. procedure. The following results were obtained, concentrations being expressed in terms of actual wax-stybutene present in the blend:

| Per Cent Wax-stybutene | A. S. T. M. Pour Point, °F. |
|---|---|
| 0 | +30 |
| 0.25 | +10 |
| 0.50 | 0 |
| 1.0 | −10 |
| 2.5 | −25 |
| 5.0 | Below −35 |

These pour depressing results are indeed very surprising, because the original stybutene copolymer per se has no substantial effect on the pour point of mineral oils in which it may be dissolved and has very low solubility in high V. I. mineral oils.

This wax-stybutene was also found to have good viscosity index improving characteristics, as shown by the following data:

| Per Cent Wax-Stybutene Added | Viscosity (Sec. Saybolt Univ. at 210° F.) | V. I. (Viscosity Index) |
|---|---|---|
| 0 | 43.4 | 107 |
| 2.5 | 53.4 | 140 |

EXAMPLE 10

Example 9 was repeated except that o-dichlorbenzene was used as solvent instead of carbon tetrachloride, and only 10 g. of anhydrous $AlCl_3$ were used instead of 20 g. Also, in this test, the stybutene solvent and chlorwax were mixed together first, and then after adjusting the temperature to about 90°–95° F., the $AlCl_3$ was added last in a thin stream over a period of 15 minutes. The reaction temperature was then maintained at 90° F. for an additional 4 hours. The product was recovered as in Example 9, and a yield of 152 g. of a mineral oil solution of the wax-stybutene condensation product in mineral oil was obtained, comprising approximately a 50% solution.

The pour depressing potency of the resulting product was determined as in Example 9, with the following results:

| Percent Wax-Stybutene in Blend | A. S. T. M. Pour Point °F. |
|---|---|
| 0.25 | +30 |
| 0.50 | −5 |
| 1.0 | −10 |
| 2.5 | Below −30 |
| 5.0 | Below −35 |
|  | Below −35 |

It is noted that this condensation product showed even more remarkable pour depressing characteristics than the one made in Example 9, since 0.25% of the product made in Example 10 reduced the pour point from +30° F. down to −5° F., and 1% of this product reduced the pour point down to −30° F. It is interesting to note, however, that the products of both Examples 9 and 10 show that the unusual results when added in increasingly larger concentrations from 0.25% to 5% may continue to get better pour depressing properties, whereas many pour depressors of the prior art are only effective in relatively small concentrations, for instance, getting the best pour depressing properties in a concentration of about 0.5% or 1% or slightly more, and then causing an actual rise of the pour point of the blend if used in increasingly larger concentrations, for instance, up to 5%.

The condensation product of Example 10 was also tested for V. I. characteristics, with the following results:

| Percent Wax-Stybutene Added | Viscosity (Sec. Saybolt Univ. at 210° F.) | V. I. (Viscosity Index) |
|---|---|---|
| 0 | 43.4 | 107 |
| 2.5 | 49.3 | 130 |

This condensation product was not quite as effective in regard to viscosity index improvement as was that produced in Example 9, even though it was superior in regard to pour depressing properties.

EXAMPLE 11

Experimental data on the wax-stybutene of Example 10 in 135 M. P. wax is given as follows:

Tensile, pounds per square inch
135 M. P. wax ------------------------ 220
1% wax-stybutene in 135 M. P. wax ------ 260
3% wax-stybutene in 135 M. P. wax ------ 270
5% wax-stybutene in 135 M. P. wax ------ 280

Flex test proved that the wax-stybutene polymer reduced brittleness of 135 M. P. wax at 25° C.

EXAMPLE 12

A stybutene copolymer was made at −44° C. by the use of BF₃ type catalyst. The catalyst was added to the olefin feed as a gas. The active olefin feed was formulated from 200 ml. of styrene and 800 ml. of isobutylene. After the polymer had been washed and dried it was reacted as follows:

(14% Cl wax that contained
  2% F) ---------------------------grams-- 50
Stybutene copolymer ----------------do---- 20
AlBr₂Cl ----------------------------do---- 2
Tetrachlorethane --------------------ml---- 150
Time of reaction -----------------hours-- 2
Temperature of reaction -------------°F---- 125

The resulting polymer, as made above, was washed with alcohol, dried and blended in mineral oil. The results were as follows:

| Percent Polymer | C. S. Vis. at 100° F. | C. S. Vis. at 210° F. | V. I. |
|---|---|---|---|
| 0 |  | 5.5 | 112 |
| 1 | 40.6 | 6.79 | 130 |
| 3 | 52.4 | 8.43 | 133 |
| 6 | 78.8 | 12.41 | 139 |

EXAMPLE 13

An alpha methyl para methyl styrene-isobutylene copolymer was made at −44° C. by the use of AlBr₂Cl catalyst in methyl chloride. The catalyst was added to the active olefin feed as a solution. The active feed was formulated from 100 ml. alpha-methyl para methyl styrene and 900 ml. of isobutylene. After the polymerization reaction the product was washed with isopropyl alcohol, water and then dried. It was then reacted under the conditions given below:

(Dimer of trichloro, trifluoro
  propylene) ---------------------grams-- 100
Copolymer --------------------------do---- 30
AlCl₃ ------------------------------do---- 10
Tetrachlorethane --------------------do---- 150
Time of reaction -----------------hours-- 6
Temperature of reaction -------- °F-- 98° to 125

The resulting polymer, as made above, was washed with alcohol, dried, and blended in mineral oil. The results are given below:

| Percent Polymer | C. S. Vis. at 210° F. | V. I. |
|---|---|---|
| 0 | 5.50 | 112 |
| 3 | 8.97 | 139 |

The polymer oil blend, with a viscosity of 8.97 centistokes at 210° F., was treated with 1% by weight of the barium salt of sulfurized alkylated phenol and tests indicated that this compounded lubricant was clear at low temperatures, that is, 25° F. Below this temperature some wax was precipitated from the high wax type base oil. However, tests proved that the compounded oil had a pour point 14 degrees below that of the original starting oil.

These new oil blends may be compounded with pour depressors such as that made by condensing chlorwax with naphthalene or phenol, polybutene, polylauryl acrylate, graphite, dyes, silicon oils, etc.

From the foregoing examples it will be noted that reaction temperatures ranged from 90° to 210° F. over varying time periods. The proportions of reactants, copolymer and alkene halide (usually dihalide), varied from 20 to 90 parts of the copolymer and 20 to 200 parts of the alkene halide.

When these new reaction products are formulated from unsaturated tripolymers they can be treated in solution with S$_x$Cl$_x$ (sulfur chlorides having various ratios of sulfur and chlorine) to formulate gels that have a number of uses. In other words, a new type synthetic rubber is formulated under these conditions.

It is not intended that this invention be limited to the specific example which have been given merely for the sake of illustration, but only by the appended claims in which it is intended to claim all novelty inherent in the invention as well as all modifications coming within the scope and spirit of the invention.

We claim:

1. The process according to claim 13 in which the reagent has the general formula XRX in which R is an aliphatic hydrocarbon group, and X represents halogen linked to R through aliphatic carbon linkages.

2. Process which comprises condensing 20 to 90 parts by weight of a styrene-isobutylene copolymer with 20 to 200 parts of an alkene dihalide in the presence of a Friedel-Crafts catalyst at a temperature ranging from 90° to 210° F.

3. Process which comprises condensing 20 to 90 parts by weight of a styrene-isobutylene copolymer having an intrinsic viscosity in toluene above 0.10 with 20 to 200 parts of ethylene dichloride in the presence of aluminum chloride as catalyst at a temperature ranging from 90° to 210° F.

4. The process which comprises condensing 20 to 90 parts by weight of styrene-isobutylene copolymer with 20 to 200 parts of a chlorinated paraffin wax of 10 to 30% chlorine content in the presence of a Friedel-Crafts catalyst at a temperature ranging from 90° to 210° F.

5. The process which comprises condensing 20 to 90 parts by weight of styrene-isobutylene copolymer with 20 to 200 parts of a halogenated paraffin wax of 10 to 30% halogen content in the presence of a Friedel-Crafts catalyst at a temperature ranging from 90° to 210° F.

6. The process which comprises condensing 20 to 90 parts by weight of a styrene-isobutylene copolymer with 20 to 200 parts of a chlorinated paraffin wax that contains about 2% fluorine in the presence of a Friedel-Crafts catalyst at a temperature ranging from 90° to 210° F.

7. The method of treating a copolymer of a polymerizable aromatic hydrocarbon containing one mono olefinic side chain and at least one polymerizable aliphatic olefin of 4 to 8 carbon atoms, said copolymer having more than 50% combined cyclic constituent and being normally insoluble in highly paraffinic oils, so that said copolymer will become soluble in said oils, which comprises reacting 20 to 90 parts by weight of said copolymer with 20 to 200 parts of a halogenated paraffin wax in the presence of AlCl₃ at a temperature ranging from 90° to 210° F. to obtain a condensation product.

8. Process which comprises reacting 20 to 90 parts by weight of a styrene-isobutylene-polyene tripolymer with 20 to 200 parts of polyhalogenated aliphatic hydrocarbon in the presence of a Friedel-Crafts catalyst at a temperature ranging between 90° and 210° F.

9. Product comprising essentially a condensation product of 20 to 200 parts by weight of halogenated paraffin wax of 10 to 30% halogen content with 20 to 90 parts of a styrene-isobutylene copolymer.

10. Product according to claim 9 derived from a copolymer having an intrinsic viscosity in toluene of at least 0.12 and having a combined styrene content of about 0.1% to 85% by weight.

11. Product comprising essentially a condensation product soluble in waxy mineral lubricating oils and having the property of depressing the pour point thereof when added thereto in small amounts, and also having viscosity index improving characteristics, said product being a condensation product of about 20 to 450 parts by weight of chlorinated paraffin wax having a chlorine content of about 10% to 20%, with about 100 parts by weight of a styrene-isobutylene copolymer having an intrinsic viscosity in toluene of at least about 0.12 to 10.0 and having a combined styrene content of about 5% to 85% by weight.

12. Product obtained by reacting 20 to 90 parts by weight of a styrene-isobutylene-polyene tripolymer with 20 to 200 parts of a polyhalogenated organic compound, said product being oil-soluble before sulfur-type curing.

13. The process which comprises chemically condensing 20 to 90 parts by weight of a copolymer of a polymerizable aromatic hydrocarbon containing one mono olefinic side chain and an aliphatic olefin containing from 4 to 8 carbon atoms with 20 to 200 parts of a material consisting essentially of an alkene dihalide, said process being carried out in the presence of a Friedel-Crafts catalyst at a temperature ranging from 90° to 210° F.

14. A product consisting essentially of the condensation product of 20 to 200 parts by weight of an alkene dihalide and 20 to 90 parts of a copolymer of a polymerizable aromatic hydrocarbon containing one mono olefinic side chain and at least one but not more than 2 aliphatic olefins containing from 4 to 8 carbon atoms.

WILLIAM J. SPARKS.
DAVID W. YOUNG.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,239,501 | Frolich | Apr. 22, 1941 |
| 2,274,749 | Symers | Mar. 3, 1942 |
| 2,301,926 | Blomer | Nov. 17, 1942 |
| 2,336,620 | Lieber | Dec. 14, 1943 |
| 2,365,127 | Thomas | Aug. 22, 1944 |